Figure 1:
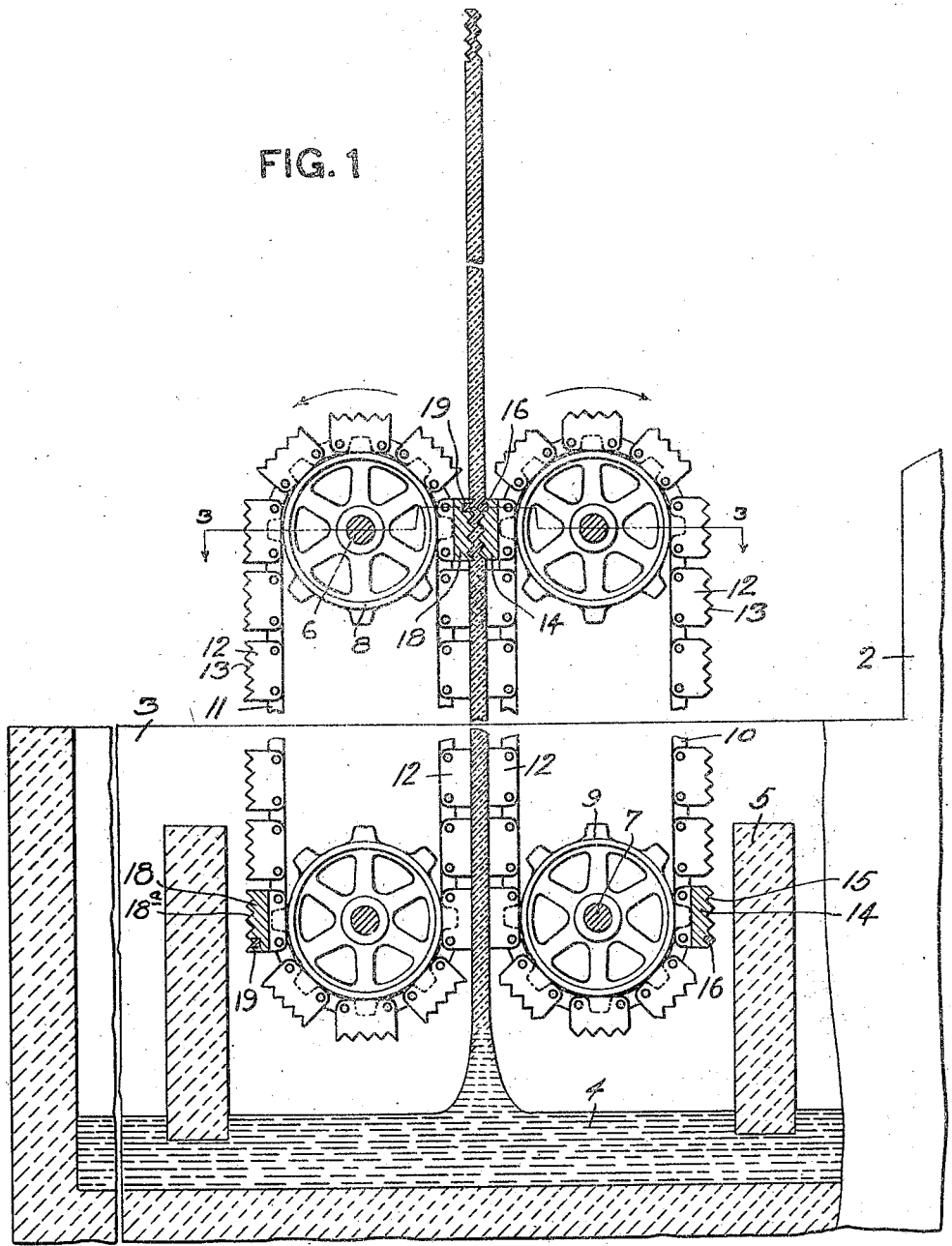

H. S. CAMPBELL.
METHOD OF GRIPPING AND CUTTING SHEET GLASS.
APPLICATION FILED DEC. 23, 1919.

1,367,858.

Patented Feb. 8, 1921.

INVENTOR
Hudson S. Campbell
By Kay & Totten
Attorneys

H. S. CAMPBELL.
METHOD OF GRIPPING AND CUTTING SHEET GLASS.
APPLICATION FILED DEC. 23, 1919.

1,367,858.

Patented Feb. 8, 1921.
3 SHEETS—SHEET 3.

INVENTOR
Hudson S. Campbell
By Kay & Totten
Attorneys

UNITED STATES PATENT OFFICE.

HUDSON S. CAMPBELL, OF CLARKSBURG, WEST VIRGINIA.

METHOD OF GRIPPING AND CUTTING SHEET-GLASS.

1,367,858.      Specification of Letters Patent.      Patented Feb. 8, 1921.

Application filed December 23, 1919. Serial No. 346,852.

*To all whom it may concern:*

Be it known that I, HUDSON S. CAMPBELL, a citizen of the United States, and resident of Clarksburg, in the county of Harrison and State of West Virginia, have invented a new and useful Improvement in Methods of Gripping and Cutting Sheet-Glass; and I do hereby declare the following to be a full, clear, and exact description thereof.

My invention relates to a method of gripping and cutting sheet glass.

In an application filed by me on the 12th day of February, 1919, Serial No. 276,891, I have set forth and claimed a method of drawing sheet glass in which the sheet of glass is drawn continuously from a molten bath of glass, the glass being severed and simultaneously therewith the succeeding sheet is gripped while it is still in its plastic soft condition. In that method the glass was severed by a knife edge on one of the gripping bars coöperating with the oppositely arranged gripping bar to sever or cut the sheet transversely during the drawing operation. The present invention relates to a method by which this cutting or severing of the sheet during the draw is accomplished by electrical means, provision being made for nicking the glass transversely of the sheet, and at the same time heating it along this line electrically so that it may be readily broken or cracked off along this line of heat.

Figure 2:
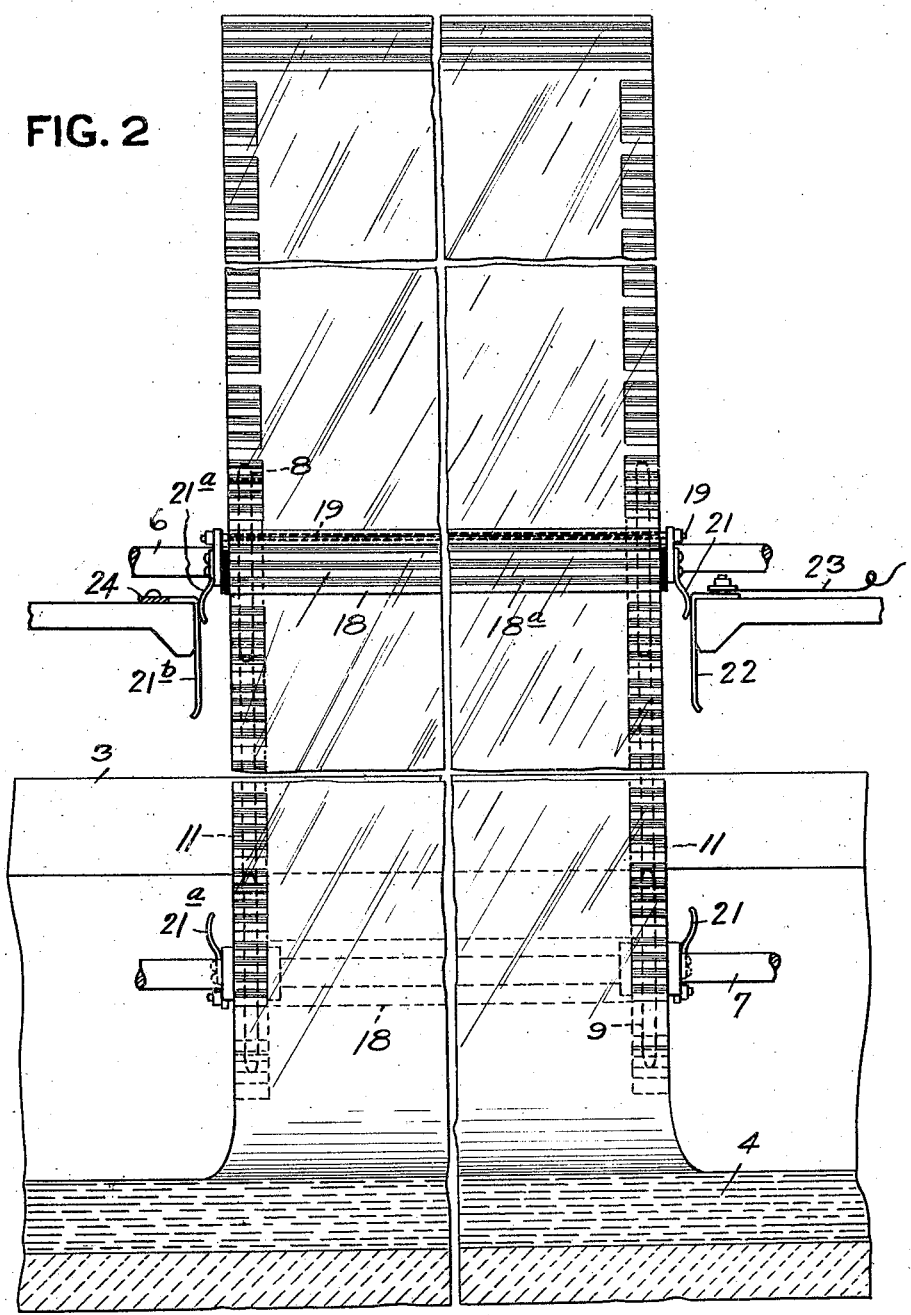
Figure 3:
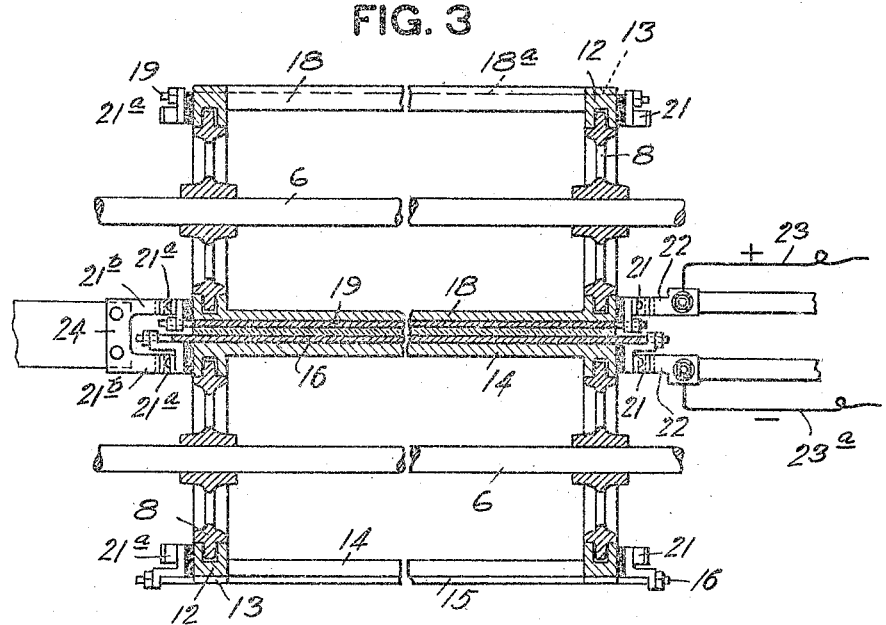
Figure 4:
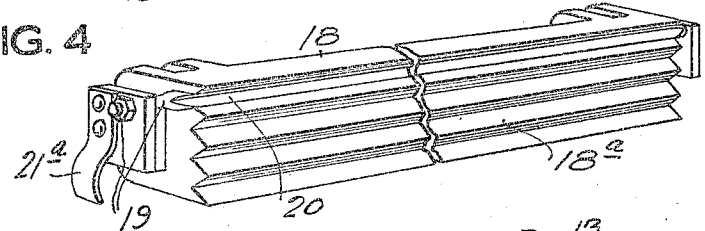
Figure 5:
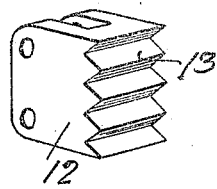
Figure 6:
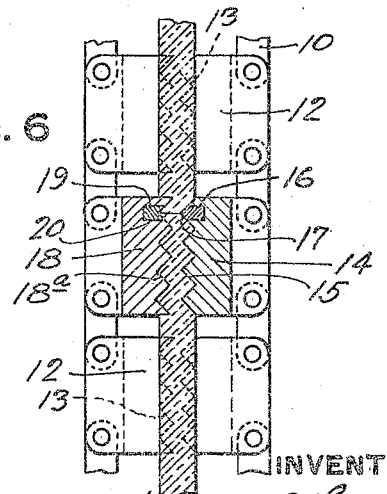

In the accompanying drawings, I have illustrated apparatus for carrying out my improved method in which Figure 1 is a view of a portion of a furnace with the forehearth or dog-house extension showing in section with the drawing apparatus arranged therein; Fig. 2 is a view taken at right angles to Fig. 1; Fig. 3 is a cross-section on the line 3—3, Fig. 1; Fig. 4 is a perspective view of one of the gripping and nicking bars; Fig. 5 is a perspective view of one of the edge gripping bars; and Fig. 6 is a cross-section of the gripping and nicking bars shown in connection with a portion of the chain.

In the drawings, the numeral 2 designates a portion of a suitable tank or furnace with the forehearth or dog-house 3 into which the glass 4 flows from said furnace 2. In order to cut off to some extent the heat of the furnace from the area from which the glass sheet is drawn to permit the glass to set properly in drawing, any suitable shielding 5 may be employed.

The upper and lower shafts 6 and 7 are arranged in pairs parallel to each other in suitable bearings, and mounted on said shaft at each end thereof are the sprocket-wheels 8 and 9, respectively. Chains 10 and 11 are mounted on said sprocket-wheels, and power is provided for driving said chains in opposite directions, as indicated by the arrows in Fig. 1. The links of the chain are provided with gripping-blocks 12 with the serrations or teeth 13 formed therein, as shown in Fig. 5.

At intervals on the chain 10 are the bars 14 which extend from one chain to the other, said bars having the serrations or corrugations 15. Secured in a seat formed in the uppermost of said serrations 15 is the contact-bar 16 formed with the knife edge 17. This contact-bar may be formed of German silver or other suitable material adapted for the purpose.

The chains 11 carry like gripping-bars 18 which are provided with the serrations or corrugations 18$^a$ and set in a seat in the uppermost of said corrugations 18$^a$ is the contact-bar 19 adapted to register with the contact-bar 16, and said contact-bar 19 has the angular seat 20 formed therein.

The bars 14 and 18 are so arranged that as the said chains travel, said bars will come into register with each other, the projections on one bar registering with the recesses of the other bar so as to grip the sheet between them as clearly shown in Fig. 6.

Secured to one of the ends of the bars 14 and 18 are the contacts or brushes 21 which are adapted to engage the contact bars 22 with the wires 23 and 23$^a$ connected thereto. The opposite ends of the bars 14 and 18 have brushes 21$^a$ which engage the contact-bars 21$^b$ connected by the yoke member 24, so that the current will pass by the wire 23 through the contact-bar 22 to the brush 21 and thence to the bar 19, passing therefrom by the yoke 24 to the bar 16. The current passes out by the wire 23$^a$ to complete the circuit.

The glass is first lifted from the supply of molten glass in the forehearth or dog-house by lowering a suitable bait and lifting the glass up between the shafts 5 and 6 until it is in position for the bars 14 and 18 to grip the same, whereupon said bars take hold of the sheet of glass and the drawing is a continuous operation, said bars acting to replace the bait. The edges of the sheet are gripped by the gripping-blocks 12.

When the contact-brushes 21 come into engagement with the contact bars 22 the nicking bar 19 is heated electrically and likewise the corresponding bar 16. This heating action will continue as long as the brushes 21 and 21ª are in contact with the contact-bars 22 and 21ᵇ. As a consequence, at the same time that the nicking of the glass is accomplished, the heating of the glass along the line of the nick takes place, and after the gripping-bars have traveled to a point where the brushes 21 and 21ª leave the contact-bars 22 and 21ᵇ the glass will have been heated along the line of the nick to such an extent as to be readily cracked or broken off.

By my method I provide a very simple and efficient method for severing the glass into sheets of any desired length, as it is apparent that by changing the position of the gripping bars, the cutting action can be made to take place at any desired point according to the size of the sheet desired.

What I claim is:

1. The method of cutting glass consisting in nicking the glass while in a plastic condition, and subsequently heating the glass along the line of the nick.

2. The method of cutting glass consisting in nicking the glass while in a plastic condition, and subsequently applying electricity to heat the glass along the line of the nick.

3. The method of cutting glass consisting in nicking the glass as it is being drawn into shape while in a plastic condition, and subsequently heating the glass along the line of the nick.

4. The method of cutting glass sheets consisting in drawing the glass from a molten bath, gripping the glass along the upper edge of the sheet, simultaneously therewith nicking the glass, and subsequently heating the glass along the line of the nick.

5. The method of drawing and cutting glass consisting in drawing the glass in the form of a sheet from a bath of molten glass, gripping the glass along the upper edge of the sheet, simultaneously therewith nicking the glass transversely, and subsequently heating the glass electrically along the line of the nick.

6. The method of drawing and cutting glass consisting in drawing the glass in the form of a sheet from a bath of molten glass continuously, gripping the glass along the upper edge of the sheet simultaneously therewith, nicking the glass transversely and subsequently heating the glass along the line of the nick.

7. The method of drawing and cutting glass consisting in drawing the sheet continuously from a bath of molten glass, nicking the glass transversely of the sheet during the draw, and subsequently heating the glass along the line of the nick.

In testimony whereof, I, the said HUDSON S. CAMPBELL, have hereunto set my hand.

HUDSON S. CAMPBELL.

Witnesses:
L. M. BUCHANAN,
H. E. DAVISSON.